United States Patent [19]

Sakamoto et al.

[11] Patent Number: 4,496,978
[45] Date of Patent: Jan. 29, 1985

[54] NOISE DETECTING CIRCUIT AND TELEVISION RECEIVER EMPLOYING THE SAME

[75] Inventors: Junji Sakamoto; Hiroyasu Kishi, both of Gunma, Japan

[73] Assignees: Sanyo Electric Co., Ltd.; Tokyo Sanyo Electric Co., Ltd., both of Japan

[21] Appl. No.: 351,224

[22] Filed: Feb. 22, 1982

[30] Foreign Application Priority Data

Feb. 27, 1981 [JP]  Japan ................................. 56-28579

[51] Int. Cl.³ ............................................. H04N 5/08
[52] U.S. Cl. .................................................. 358/155
[58] Field of Search ............... 358/155, 157, 158, 166, 358/167, 36, 38, 40, 169, 39, 37

[56] References Cited

U.S. PATENT DOCUMENTS

| | | | |
|---|---|---|---|
| 3,207,844 | 9/1965 | Massman | 358/157 |
| 3,334,182 | 8/1967 | Legler | 358/158 |
| 4,042,959 | 8/1977 | Klein | 358/157 |
| 4,204,219 | 5/1980 | Uchida | 358/157 |
| 4,212,032 | 7/1980 | Harford | 358/157 |
| 4,376,952 | 3/1983 | Troiano | 358/167 |

Primary Examiner—Michael A. Masinick
Attorney, Agent, or Firm—Darby & Darby

[57] ABSTRACT

A noise detecting circuit in a television receiver, which comprises a horizontal synchronizing signal separating circuit (17) for separating a horizontal synchronizing signal from a detected composite video signal, a differential circuit (101) for extracting a noise component included in the horizontal synchronizing signal period of the composite video signal as a function of the separated horizontal synchronizing signal, and a rectifying circuit (102) for rectifying the extracted noise component for providing a direct current voltage associated with the magnitude of the noise component in the composite video signal. The noise detected output is applied to an automatic frequency control circuit (26) for the purpose of controlling the sensitivity of an automatic frequency control operation thereof. The noise detected output is also applied to the automatic frequency control circuit (26) for the purpose of controlling the impedance of a filter thereof. Synchronization of a horizontal output signal with the horizontal synchronizing signal is also detected and the control of the automatic frequency control circuit (26) responsive to the noise detected output is disabled responsive to a non-synchronization detected output and the sensitivity of the automatic frequency control circuit (26) and the impedance of the filter thereof are also controlled responsive to the non-synchronization detected output.

15 Claims, 10 Drawing Figures

NOISE DETECTING CIRCUIT AND TELEVISION RECEIVER EMPLOYING THE SAME

BACKGROUND OF THE INVENTION

1. Field of the Invention

The present invention relates to a noise detecting circuit in a television receiver and a television receiver employing the same. More specifically, the present invention relates to an improvement in detecting with accuracy a noise component in a detected composite video television signal and an improved television receiver employing a control responsive to the noise detected output.

2. Description of the Prior Art

Generally, in reception by a television receiver of a television broadcasting signal of a small electric field intensity or of a weak electric field intensity, a high frequency amplifying circuit and an intermediate frequency amplifying circuit having an automatic gain control function operate with the most increased gain. The magnitude of a noise component such as a white noise included in a detected composite video signal obtained from a video detector is accordingly increased. When such a noise component becomes larger in the composite video signal, horizontal synchronization is liable to be interfered with and hence a contour line in the vertical direction or a circle pattern on the screen is flared or a portion of an image on the screen is moved in the horizontal direction. Thus, horizontal jitter is caused on the occasion of weak electric field intensity. Such phenomenon is caused because the response sensitivity of a horizontal synchronization automatic frequency control circuit is rather good and the control signal thereof fluctuates in response to the noise component, whereby the oscillation frequency of the horizontal oscillating circuit accordingly fluctuates in response to the fluctuation of the control signal. Therefore, one approach to eliminate such inconvenience is to decrease the fluctuation of the oscillation frequency of the horizontal oscillating circuit by decreasing the sensitivity of the horizontal synchronization automatic frequency control circuit in accordance with the magnitude of a noise component included in the composite video signal.

On the other hand, it is necessary to maintain synchronization of the horizontal output signal with the horizontal synchronizing signal by changing the oscillation frequency of the horizontal oscillating circuit when the horizontal output signal from the horizontal output circuit becomes out of synchronization with the horizontal synchronizing signal. To that end, it is necessary to make fast the phase control by increasing the sensitivity of the horizontal synchronization automatic frequency control circuit in the case where the horizontal output signal becomes out of synchronization with the horizontal synchronizing signal. However, whereas it is possible to decrease occurrence of the horizontal jitter when the noise component in the composite video signal is increased by decreasing the sensitivity of the horizontal synchronizing automatic frequency control circuit, it becomes difficult to make the horizontal output signal follow the horizontal synchronizing signal when the horizontal output signal becomes out of synchronization with the horizontal synchronizing signal. Conversely, assuming that the sensitivity of the horizontal synchronizing automatic frequency control circuit is increased, it is possible to make the oscillation frequency of the horizontal oscillating circuit follow that of the horizontal synchronizing signal more quickly when the electric field intensity is large but it becomes difficult to decrease a horizontal jitter when the noise component in the composite video signal is increased on the occasion of a weak electric field intensity. Thus, it is difficult to control the response sensitivity of the horizontal synchronization automatic frequency control circuit so that a horizontal jitter may be decreased even when a noise component in the composite video signal is increased on the occasion of a weak electric field intensity and the horizontal output signal may be synchronized with a horizontal synchronizing signal on the occasion of a strong electric field intensity.

One example of a horizontal synchronization automatic frequency control circuit adapted for providing a good picture quality on the occasion of either a strong electric field intensity or a weak electric field intensity is disclosed in the U.S. Pat. No. 3,334,182, issued Aug. 1, 1967 to Ernst Legler. The referenced U.S. patent comprises a dual automatic frequency control circuit including the first line synchronizing circuit and the second line synchronizing circuit. However, the above described dual automatic frequency control circuit of the referenced U.S. patent involves a shortcoming in that the circuit configuration is complicated.

Therefore, it is desired that a television receiver of a relatively simple structure be provided that is capable of reproducing on the screen a picture of a good quality by controlling the response sensitivity of a horizontal synchronization automatic frequency control circuit on the occasion of either a strong electric field intensity or a weak electric field intensity and even in the case where the horizontal output signal becomes out of synchronization with the horizontal synchronizing signal. To that end, it is necessary to detect the magnitude of a noise component included in a detected composite video signal. One possible approach for detecting a noise component in a detected composite video signal is to utilize an automatic gain control voltage. However, as well known, an automatic gain control voltage is rather representative of a combination of a noise component and a signal and for this reason does not accurately represent a noise component itself in a detected composite video signal even though an electric field intensity is accurately detected by way of an automatic gain control voltage.

SUMMARY OF THE INVENTION

As well known, a composite video signal of television comprises a video signal divided by a synchronizing signal, such as a horizontal synchronizing signal at predetermined time intervals. A video signal includes frequency components of 0 to a few MHz. On the other hand, a noise is usually superimposed on the composite video signal distributed throughout the same and includes components of a wide frequency range. For this reason, it is difficult to discriminate a noise component superimposed on a video signal. However, since the synchronizing signal as such has been allotted a predetermined black level and has no video signal component of some frequency, the synchronizing signal period would be most appropriate for the purpose of noise detection, inasmuch as the same noise component as that on the video signal is also superimposed on even the synchronizing signal. The present invention pays attention to this point.

Briefly described, the present invention comprises extraction of a noise component included in a synchronizing signal period of a detected composite video signal by gating the composite video signal in response to a synchronizing signal separated from the composite video signal, and rectification and smoothing of the extracted noise component.

Therefore, according to the present invention, a direct current voltage associated with the magnitude of a noise component included in the synchronizing signal period of the composite video signal can be obtained as a noise detected signal accurately representing the magnitude of the noise component included in the composite video signal. Since such noise detected signal can be obtained by simply gating the composite video signal with a synchronizing signal and by rectifying and smoothing the gated output, the inventive circuit can be implemented with a simple structure.

In a preferred embodiment of the present invention, a horizontal synchronizing signal is obtained with a slight delay from a detected composite video signal. The composite video signal is gated with the above described delayed horizontal synchronizing signal, whereby a spike noise which could be caused due to the leading edge of the original horizontal synchronizing signal in signal processing thereof can be removed, because the leading edge portion of the original horizontal synchronizing signal is not covered by the delayed horizontal synchronizing signal. Furthermore, by rectifying the extracted noise component with the polarity opposite to that of a spike noise that could be caused due to the trailing edge of the original horizontal synchronizing signal in signal processing thereof, such spike noise associated with the trailing edge of the original horizontal synchronizing signal can also be removed.

In another preferred embodiment of the present invention, the gain of a horizontal synchronization automatic frequency control circuit is controlled in response to the above described direct current voltage representing the magnitude of the noise component in the composite video signal. The impedance of a filter coupled to the output of the horizontal synchronization automatic frequency control circuit is also controlled in response to the noise component associated direct current voltage. Therefore, according to the embodiment shown, when the magnitude of a noise component included in the composite video signal is increased as the electric field intensity becomes weak, the gain of the horizontal synchronization automatic frequency control circuit is decreased and the impedance of the filter coupled to the output of the automatic frequency control circuit is decreased. As a result, fluctuation of a control signal obtained from the horizontal synchronization automatic frequency control circuit can be decreased. Therefore, the oscillation frequency of the horizontal oscillating circuit controlled responsive to the output of the horizontal synchronization automatic frequency control circuit can be prevented from fluctuating depending on the magnitude of the noise component included in the composite video signal.

In a further preferred embodiment of the present invention, detection is further made of whether the horizontal output signal has been synchronized with the horizontal synchronizing signal. Control of the gain of the horizontal synchronization automatic frequency control circuit and control of the impedance of a filter coupled to the output of the automatic frequency control circuit are disabled responsive to a non-synchronization detected signal. Thus, the gain of the horizontal synchronization automatic frequency control circuit is increased and also the impedance of the filter is also increased in response to the above described non-synchronization detected signal. Therefore, according to the embodiment, the gain of the horizontal synchronization automatic frequency control circuit is increased in the case where the horizontal output signal becomes out of synchronization with the horizontal synchronizing signal and therefore the control signal obtained from the horizontal synchronization automatic frequency control circuit can be changed more. Accordingly, the oscillation frequency of the horizontal oscillating circuit can be controlled with an increased sensitivity such that the phase of the horizontal output signal may coincide with the phase of the horizontal synchronizing signal.

In still a further preferred embodiment of the present invention, the gain of a color control circuit of a color television receiver may be controlled in response to a noise component detected signal representing an increase of the noise component included in the composite video signal. As a result, a color noise on the picture can be reduced. According to the preferred embodiment of the present invention, a high frequency component in the composite video signal can also be attenuated by a video tone controlling circuit in response to an increase of the noise component. As a result, the picture can be reproduced on the screen with a soft appearance. Furthermore, according to the preferred embodiment of the present invention, the gain of a contrast circuit can also be controlled in response to an increase of the noise component. As a result, a flickering phenomenon due to a change in the brightness on the screen due to an increase of the noise component can also be decreased.

Accordingly, a principal object of the present invention is to provide a noise detecting circuit of a relatively simple structure which is capable of accurately detecting a noise component included in a detected composite video signal.

One aspect of the present invention resides in a television receiver which is capable of reproducing a picture of a good quality in response to detection of a noise component included in a detected composite video signal.

Another aspect of the present invention resides in a horizontal synchronization automatic frequency control circuit for a television receiver which is capable of preventing a horizontal jitter from occurring by controlling a horizontal synchronization automatic frequency control circuit in response to accurate detection of a noise component included in a detected composite video signal.

A further aspect of the present invention resides in a control of a horizontal synchronization automatic frequency control circuit for a television receiver which is capable of reproducing a picture of a good quality on the screen even in the case where an increased noise component is included in a detected composite video signal and the horizontal output signal becomes out of synchronization with the horizontal synchronizing signal.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
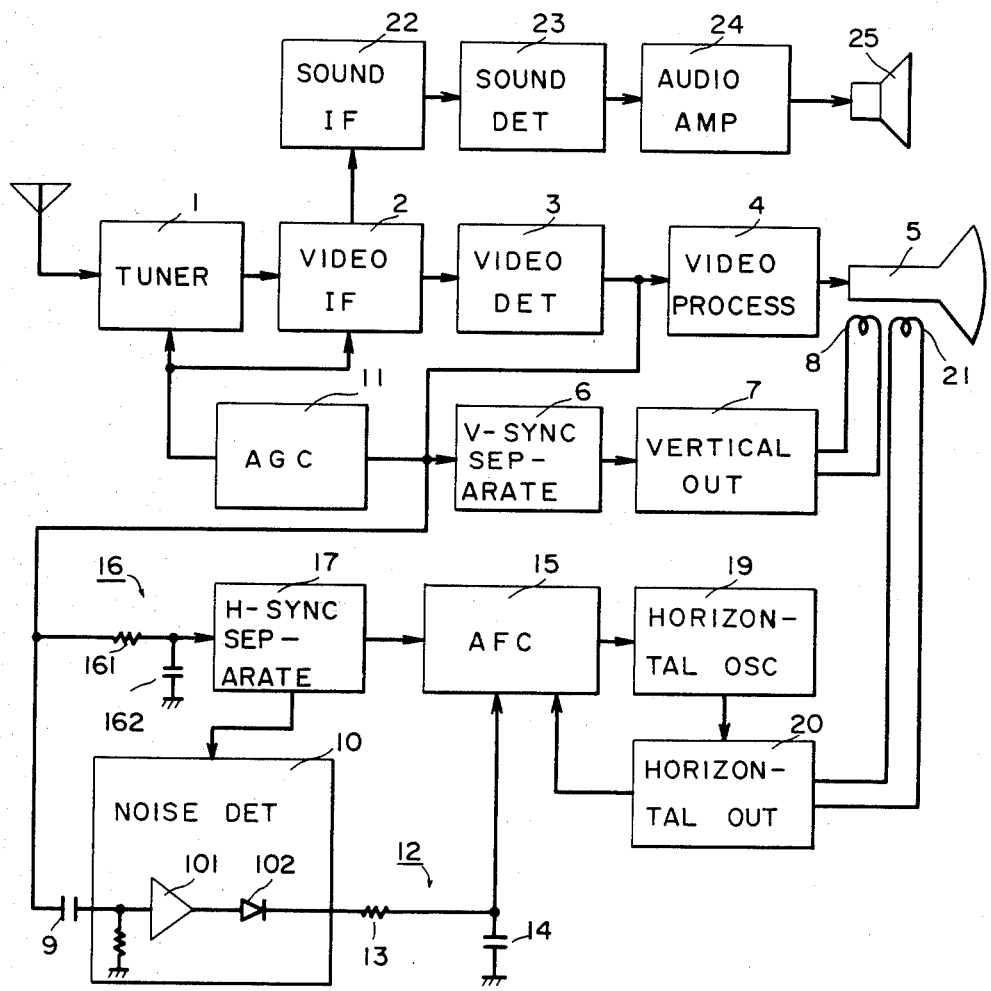
FIG. 1 is a block diagram of a television receiver in accordance with one embodiment of the present invention.

FIG. 1 is a block diagram of a television receiver in accordance with one embodiment of the present invention. First referring to FIG. 1, a structural outline of the television receiver will be described. A television signal is applied to a tuner 1 through an antenna. The tuner 1 operates to be tuned to a desired television signal, thereby to convert the television signal into a video intermediate frequency signal. The video intermediate frequency signal from the tuner 1 is applied to a video intermediate frequency amplifying circuit 2. The video intermediate frequency amplifying circuit 2 serves to amplify the video intermediate frequency signal and provides the amplified output to a video detecting circuit 3. The video detecting circuit 3 detects the video intermediate frequency signal to provide a composite video signal including a horizontal synchronizing signal and a vertical synchronizing signal. The composite video signal is applied through a video signal processing circuit 4 to a picture tube 5.

The composite video signal obtained from the video detecting circuit 3 is applied to an automatic gain control circuit 11. The automatic gain control circuit 11 is responsive to the output from the video detecting circuit 3 to provide an automatic gain control signal representation of the electric field intensity of a television broadcasting signal being received. The automatic gain control signal is applied to the tuner 1 and the video intermediate frequency amplifying circuit 2 to control the respective gains of the tuner 1 and the video intermediate frequency amplifying circuit 2, thereby to serve to maintain constant the level of the composite video signal obtained from the video detecting circuit 3 irrespective of the electric field intensity of a television broadcasting signal to be received. More specifically, if and when the tuner 1 tunes to the frequency of an electric wave of a strong electric field intensity, the automatic gain control circuit 11 serves to decrease the respective gains of the tuner 1 and the video intermediate frequency amplifying circuit 2, so that the level of the composite video signal obtained from the video detecting circuit 3 may not be too large due to the strong electric field intensity. Conversely, if and when the tuner 1 tunes to the frequency of an electric wave of a weak electric field intensity, the automatic gain control circuit 11 serves to increase the respective gains of the tuner 1 and the video intermediate frequency amplifying circuit 2, so that the level of the composite video signal obtained from the video detecting circuit 3 may not be too small due to the weak electric field intensity. Accordingly, even when the tuner 1 tunes to the frequency of an electric wave of a weak electric field intensity, the composite video signal of substantially the same level as that when an electric wave of a strong electric field intensity is received is obtained from the video detecting circuit 3. However, in such a case not only the composite video signal but also a noise component included in the composite video signal is magnified.

The composite video signal obtained from the video detecting circuit 3 is applied to a vertical synchronizing signal separating circuit 6. The vertical synchronizing signal separating circuit 6 extracts a vertical synchronizing signal from the composite video signal and provides the same to a vertical output circuit 7. The vertical output circuit 7 is responsive to the vertical synchronizing signal to drive a vertical deflecting coil 8.

The composite video signal obtained from the video detecting circuit 3 is further applied through a low-pass filter 16 including a resistor 161 and a capacitor 162 serving as a delay means to a horizontal synchronizing signal separating circuit 17. The composite video signal is also applied through a high-pass capacitor 9 to a noise detecting circuit 10. The above described horizontal synchronizing signal separating circuit 17 extracts only the horizontal synchronizing signal from the composite video signal, which is then applied to the noise detecting circuit 10 and a horizontal synchronizing automatic frequency control circuit 15 (hereinafter simply referred to as the automatic frequency control circuit). The noise detecting circuit 10 comprises an amplifying circuit 101 and a half-wave rectifying circuit 102. The amplifying circuit 101 serves to extract a noise component included during the horizontal synchronizing signal period of the composite video signal when the horizontal synchronizing signal is applied to the amplifying circuit 101. The half-wave rectifying circuit 102 serves to rectify a noise component extracted from the amplifying circuit 101. The noise component rectified by the half-wave rectifying circuit 102 is smoothed by means of a smoothing circuit 12 including a resistor 13 and a capacitor 14, whereby the noise component is converted into a direct current voltage associated with the magnitude of the noise included in the composite video signal, which is then applied to the above described automatic frequency control circuit 15. The automatic frequency control circuit 15 serves to detect whether the horizontal output signal obtained from the horizontal output circuit 20 has coincided with the horizontal synchronizing signal in terms of the phase. The automatic frequency control circuit 15 is structured such that the sensitivity of detecting the coincidence of the phases of the horizontal output signal and the horizontal synchronizing signal is changed responsive to the direct current voltage associated with the noise component in the composite video signal obtained from the above described smoothing circuit 12. A control signal obtained from the automatic frequency control circuit 15 is applied to a horizontal oscillating circuit 19. The horizontal oscillating circuit 19 is controlled such that the oscillation frequency is changed responsive to the control signal obtained from the automatic frequency control circuit 15. The horizontal oscillation signal obtained from the horizontal oscillating circuit 19 is applied to a horizontal output circuit 20. The horizontal output circuit 20 is responsive to the horizontal oscillation signal to drive the horizontal deflecting coil 21.

A sound intermediate frequency signal is obtained midway from the above described video intermediate frequency amplifying circuit 2 and is applied to a sound intermediate frequency amplifying circuit 22. The sound intermediate frequency amplifying circuit 22 serves to amplify the sound intermediate frequency signal and provides the amplified output to a sound detecting circuit 23. The sound detecting circuit 23 serves to detect the sound intermediate frequency signal to provide an audio signal to an audio amplifying circuit 24. The audio amplifying circuit 24 amplifies the audio signal to provide an amplified output to a speaker 25.

Figure 2:
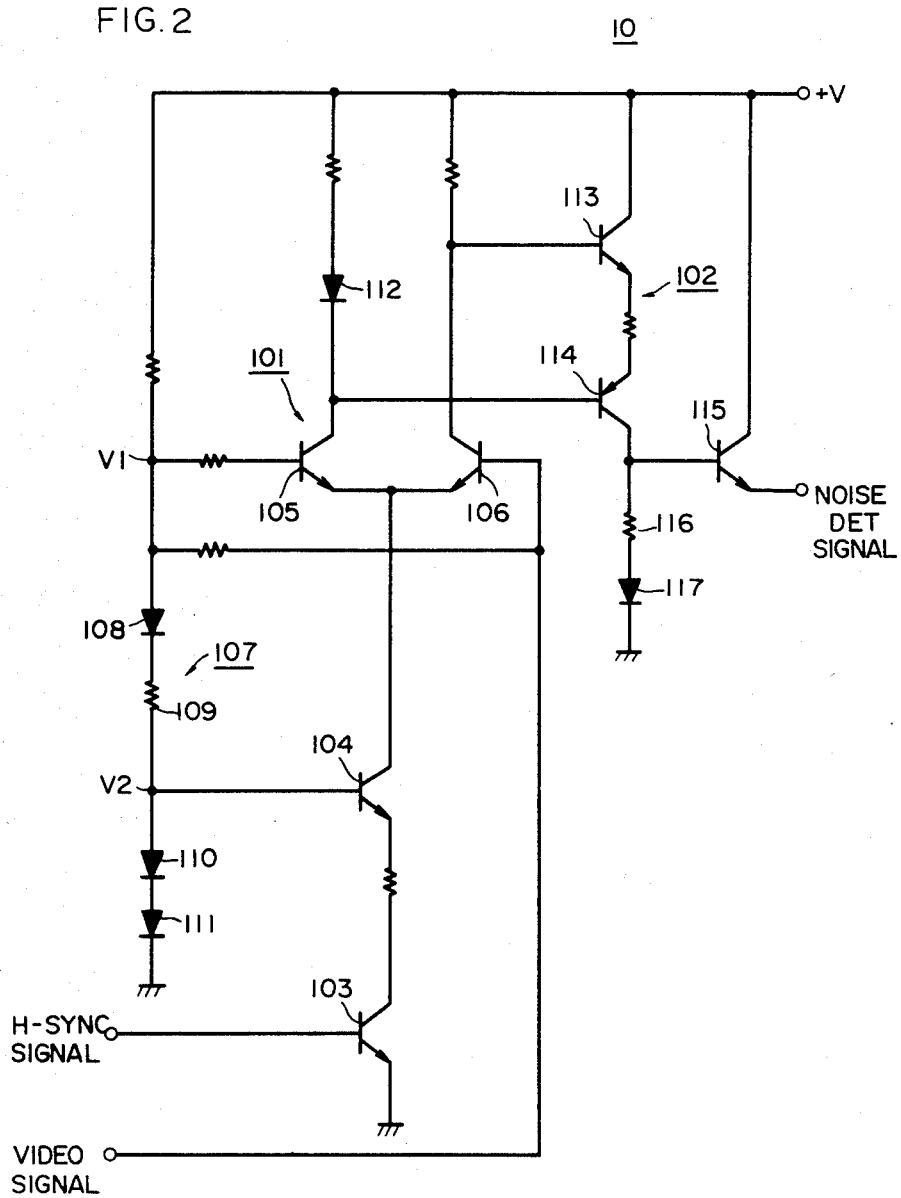
FIG. 2 is a schematic diagram of a noise detecting circuit shown in FIG. 1.

FIG. 2 is a schematic diagram of the noise detecting circuit 10 shown in FIG. 1. Now referring to FIG. 2, a structural outline of the noise detecting circuit 10 will be described. The noise detecting circuit 10 mainly comprises an amplifying circuit 101, a half-wave rectifying circuit 102, an input transistor 103, a constant current transistor 104, and a biasing circuit 107. The amplifying circuit 101 comprises a differential amplifying circuit including transistors 105 and 106. The base of one transistor 106 of the amplifying circuit 101 is supplied with a video signal component through the high-pass capacitor 9 shown in FIG. 1. The base of the input transistor 103 is supplied with a horizontal synchronizing signal obtained from the horizontal synchronizing signal separating circuit 19. The biasing circuit 107 comprises a series connection of a diode 108, a resistor 109 and diodes 110 and 111. The biasing voltage V1 established by the biasing circuit 107 is applied to the base of the other transistor 105 of the amplifying circuit 101. The biasing voltage V2 established by the biasing circuit 107 is applied to the base of the constant current transistor 104. The constant current transistor 104 serves to supply a constant current to the respective emitters of the transistors 105 and 106.

The above described half-wave rectifying circuit 102 comprises transistors 113, 114 and 115. The transistors 113 and 114 are rendered conductive when the collector of the transistor 106 of the amplifying circuit 101 is brought to the high level and the collector of the transistor 105 is brought to the low level. Accordingly, the transistors 113 and 114 are rendered conductive when a negative-going noise component is applied to the b.ase of the transistor 106 and a positive-going noise component is obtained from the collector thereof and a negative-going noise component is obtained from the collector of the other transistor 105 of the amplifying circuit 101, whereby the half-wave rectifying circuit 102 serves to half-wave rectify the noise component. The half-wave rectified voltage is obtained through the emitter of the transistor 111 The resistor 116 and the diode 117 connected to the base of the transistor 115 serve as a load register of the half-wave rectifying circuit 102 and a base-emitter voltage compensating diode of the transistor 115, respectively.

Figure 3:
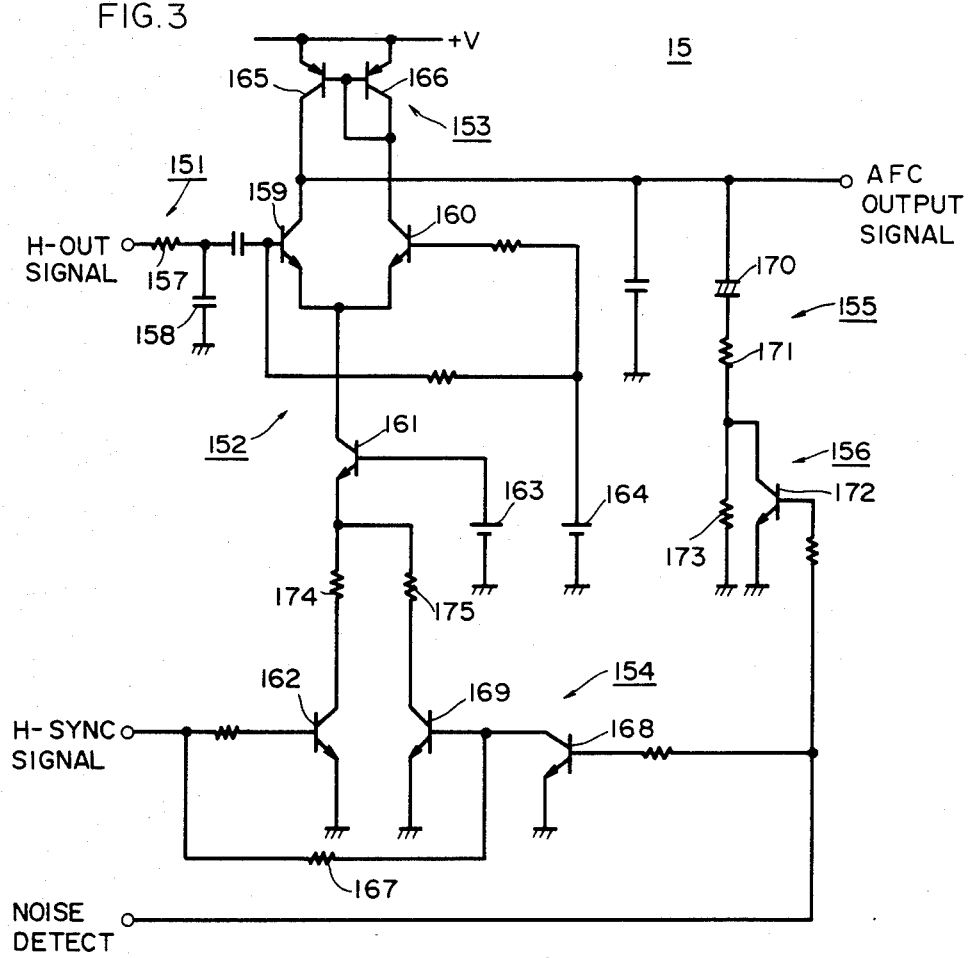
FIG. 3 is a schematic diagram of an automatic frequency control circuit shown in FIG. 1.

FIG. 3 is a schematic diagram of the automatic frequency control circuit 15 shown in FIG. 1. Now referring to FIG. 3, a structural outline of the automatic frequency control circuit 15 will be described. The automatic frequency control circuit 15 comprises an integrating circuit 151, a phase comparing circuit 152, a mirror circuit 153, a sensitivity selecting circuit 154, filter 155 and an impedance selecting circuit 156. The integrating circuit 151 is provided for the purpose of shaping the horizontal output signal obtained from the horizontal ouput circuit 20 shown in FIG. 1 to a saw-tooth waveform. The phase comparator 152 is provided for the purpose of comparing the phases of the horizontal output signal shaped to a saw-tooth waveform and the horizontal synchronizing signal and comprises a differential amplifying circuit including transistors 159 and 160 receiving the horizontal output signal, a constant current transistor 161 and a transistor 162 performing a switching operation in response to the horizontal synchronizing signal. The base of the constant current transistor 161 is supplied with a biasing voltage from a biasing voltage source 163. The bases of the transistors 159 and 160 constituting the differential amplifying circuit are also supplied with a biasing voltage from a biasing voltage source 164. The respective collectors of these transistors 159 and 160 are coupled to the mirror circuit 153 including transistors 165 and 166. The sensitivity selecting circuit 154 comprises transistors 168 and 169. The base of the transistor 168 is supplied with a noise detected signal. The collector of the transistor 168 is connected to the base of the transistor 169. The base of the transistor 169 is supplied with the horizontal synchronizing signal through a resistor 167. The collector of the transistor 169 is connected to the emitter of the constant current transistor 161 through a resistor 175. Accordingly, the sensitivity selecting circuit 154 functions such that when the noise detector signal becomes the low level the transistor 168 is rendered non-conductive and the transistor 169 is rendered conductive, whereby resistors 174 and 175 are connected in parallel, thereby to decrease the resistance value of the resistor connected to the emitter of the transistor 161. As a result, a current associated with the horizontal synchronizing signal flows more through the transistors 159 and 160 constituting the differential amplifying circuit. Therefore, the sensitivity of the phase comparing circuit 152 is increased. Conversely, if and when the noise detected signal reaches a high level, the transistor 168 is rendered conductive and the transistor 169 is rendered non-conductive and accordingly the resistors 175 and 174 are not connected in parallel any more. Accordingly, a current flowing through the differential amplifying circuit comes to be defined only by the resistor 174, with the result that the sensitivty of the phase comparing circuit 152 is decreased.

The filter 155 comprises a series connection of a capacitor 170 and a resistor 171, one end of the capacitor 170 being connected to the collector of the transistor 159 of the phase comparing circuit 152. The filter 155 also includes a resistor 173 included in the impedance selecting circuit 156 connected in series. The transistor 172 is connected at the collector and the emitter thereof in parallel with the resistor 173. The base of the transistor 172 is supplied with the noise detected signal. Accordingly, when the noise detected signal is at a low level, the transistor 172 is rendered non-conductive and as a result the resistor 173 comes to be connected in series with the filter 155, whereby the impedance of the filter 155 is increased. Conversely, when the noise detected signal reaches a high level, the transistor 172 is rendered conductive and the resistor 173 is short-circuited at both terminals, whereby the impedance of the filter 155 is decreased.

Figure 4:
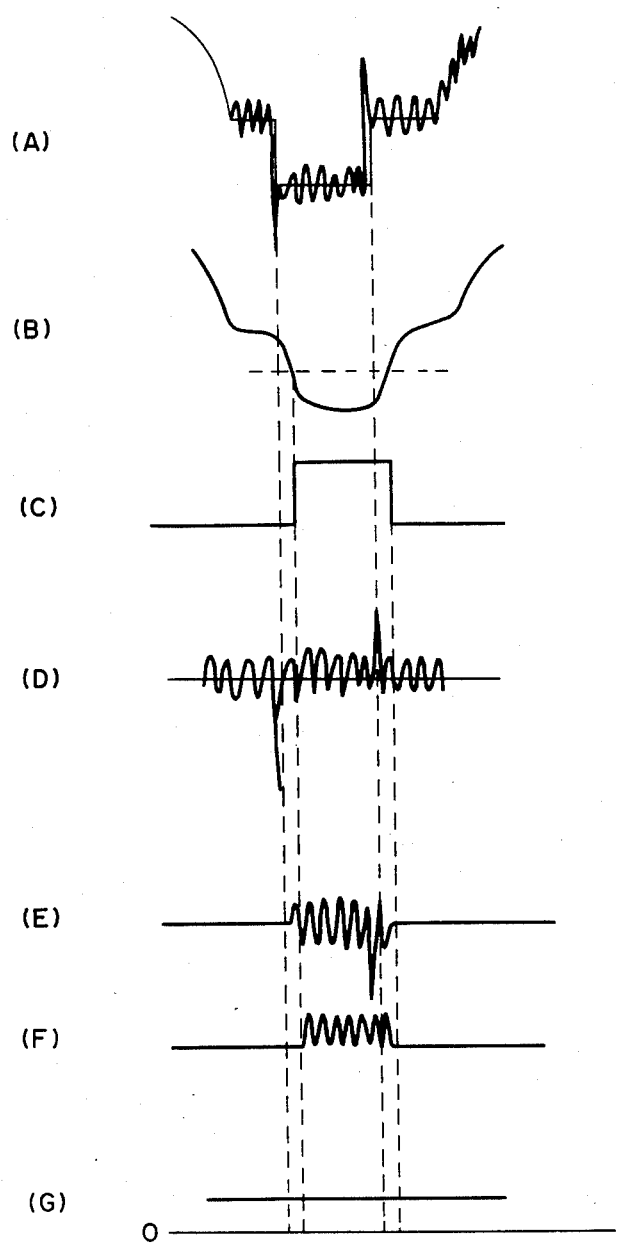
FIG. 4 is a graph for explaining the operation of the horizontal synchronizing separating circuit and a noise detecting circuit shown in FIG. 1.

Now referring to FIGS. 1 to 4, an operation of one embodiment of the present invention will be described. The composite video signal including a noise component as shown as (A) in FIG. 4 is integrated with the time constant determined by the resistor 161 and the capacitor 162 shown in FIG. 1, whereby only a noise component is removed, as shown as (B) in FIG. 4. At that time the composite video signal is delayed in terms of the phase thereof by approximately 0.3 to 1 /μ sec. The delayed composite video signal is applied to the horizontal synchronizing separating circuit 17 and is waveform shaped, whereby a horizontal synchronizing signal of the high level, as delayed as shown as (C) in FIG. 4, is obtained. The delayed horizontal synchronizing signal is applied to the noise detecting circuit 10 as a gate signal, whereby the transistor 103 shown in FIG. 2 is rendered conductive. Since the transistor 103 is rendered conductive, the constant current transistor 104 is enabled. The constant current transistor 104 is responsive to the biasing voltage applied from the biasing circuit 107 to supply a constant current to the respective emitters of the transistors 105 and 106 constituting the amplifying circuit 101. As a result, the amplifying circuit 101 is enabled only during the high level period of the horizontal synchronizing signal as shown as (C) in FIG. 4.

On the other hand, the composite video signal is applied to the base of the transistor 106 of the noise detecting circuit 10 through the high-pass capacitor 9. At that time a high frequency component, i.e. a video signal component and a noise component, as shown as (D) in FIG. 4 are extracted by means of the high-pass capacitor 9 and are applied to the base of the transistor 106. Since the amplifying circuit 101 has been enabled during the high level period of the horizontal synchronizing signal, only a noise component obtainable during the high level period of the delayed horizontal synchronizing signal is withdrawn from the amplifying circuit 101. More specifically, a noise component of an inverted polarity appears at the collector of the transistor 106 during the high level period of the horizontal synchronizing signal as shown as (E) in FIG. 4 and a noise component of the opposite polarity different from the collector output of the transistor 106 appears at the collector of the transistor 105.

Meanwhile, spike noises occur as shown as (A) in FIG. 4 at the leading and trailing edges of the horizontal synchronizing signal in signal processing such as in detection of the video intermediate frequency signal, irrespective of whether the electric field intensity is strong or not. However, the spike noise occurring at the leading edge of the horizontal synchronizing signal is not withdrawn from the amplifying circuit 101, since the said spike noise is not included in the high level period of the horizontal synchronizing signal shown as (C) in FIG. 4. More specifically, the spike noise occurring at the leading edge of the horizontal synchronizing signal is removed from the output of the amplifying circuit 101. However, the spike noise at the trailing edge of the horizontal synchronizing signal is included in the high level period of the horizontal synchronizing signal, as delayed, and thus is not removed and remains as shown as (E) in FIG. 4.

More specifically, the transistors 113 and 114 are rendered conductive only during the period of the positive polarity signal out of the noise components shown as (E) in FIG. 4 and thus it follows that the noise component is half-wave rectified as shown as (F) in FIG. 4. At that time, the spike noise appearing at the trailing edge of the horizontal synchronizing signal is of the negative-going polarity and therefore is completely removed from the rectified output. The half-wave rectified output is applied to the base of the transistor 115 and is obtained from the emitter of the transistor 105.

The half-wave rectified output thus obtained from the noise detecting circuit 10 is smoothed by the smoothing circuit 12 shown in FIG. 1, whereby a direct current voltage as shown as (G) in FIG. 4 is obtained. Accordingly, the noise detecting circuit 10 serves to remove both the spike noises of the leading and trailing edges of the horizontal synchronizing signal and provides, as a noise detected signal, the direct current voltage proportional to the amplitude of the noise component appearing during the horizontal synchronizing signal of the composite video signal. The noise detected signal is applied to the automatic frequency control circuit 15 shown in FIG. 3.

Referring to FIG. 3, in the case of a decreased noise component included in the composite video signal, the noise detected signal is at a low level. Therefore, the sensitivity selecting circuit 154 serves to select an increased sensitivity of the phase comparing circuit 152. More specifically, the transistor 168 included in the sensitivity selecting circuit 154 is responsive to the noise detecting signal of the low level to be rendered non-conductive, whereby the collector of the transistor 168 reaches a high level. Therefore, the transistor 169 is rendered conductive and the resistor 175 comes to be connected in parallel with the resistor 174. At the same time, the horizontal synchronizing signal is supplied to the base of the transistor 162, whereby the transistor 162 is rendered conductive. Accordingly, the resistors 174 and 175 come to be connected in parallel with the emitter of the constant current transistor 161, whereby the whole resistance value is decreased.

On the other hand, the horizontal output signal obtained from the horizontal output circuit 20 is waveform shaped to a sawtooth waveform by means of the integrating circuit 151 including the resistor 157 and the capacitor 158 and the sawtooth waveform output is applied to the base of the transistor 159. At that time, a current associated with the horizontal synchronizing signal flows through the constant current transistor 161 into the respective emitters of the transistors 159 and 160. Since the resistors 174 and 157 are connected in parallel, a relatively large value of the current flows. Therefore, the phase comparing circuit 152 serves to compare, with an increased sensitivity, the phase of the horizontal synchronizing signal and the phase of the horizontal output signal waveform shaped to a sawtooth waveform, whereby a voltage associated with the phase difference is applied to the filter 155. At that time, since the noise detected signal is at the low level, the transistor 172 of the impedance selecting circuit 156 has been rendered non-conductive and the resistor 173 has been connected in series with the filter 155. More specifically, the impedance of the filter 155 is large. Therefore, the filter 155 has a decreased integrating effect in integrating the voltage associated with the phase difference obtained from the phase comparing circuit 152.

Conversely, when the noise component is increased, the noise detected signal changes to the high level and the sensitivity selecting circuit 154 operates to decrease the sensitivity of the phase comparing circuit 152. More specifically, since the transistor 168 is rendered conductive and the transistor 169 is rendered non-conductive, the resistor 175 is rendered ineffective. Accordingly, only the resistor 174 comes to be connected to the emitter of the constant current transistor 161, whereby the resistance value is increased. Accordingly, a current associated with the horizontal synchronizing signal flowing through the differential circuit including the transistors 159 and 160 is decreased. As a result, the phase comparing circuit 152 comes to operate with a decreased sensitivity of comparing the phases of the horizontal synchronizing signal and the horizontal output signal waveform shaped to a sawtooth waveform. Thus, in the case of an increased noise component, fluctuation of the voltage associated with the phase difference obtained from the phase comparing circuit 152 is decreased. The impedance selecting circuit 156 serves to decrease the impedance of the filter 155 due to the fact that the noise detected signal changes to the high level. More specifically, the transistor 172 is rendered conductive, thereby to short-circuit the resistor 173. Accordingly, the filter 155 operates with an increased effect of integrating the voltage associated with the phase difference obtained from the phase comparing circuit 152.

Thus, when the noise component included in the composite video signal is increased, the sensitivity of the phase comparing circuit 152 is decreased and the integrating effect of the filter 155 is also increased, with the result that fluctuation of the control voltage applied to the horizontal oscillating circuit 19 can be decreased. As a result, in spite of an increased noise component, fluctuation of the oscillation frequency of the horizontal oscillating circuit 19 can be decreased and a horizontal jitter can be accordingly decreased.

Figure 5:
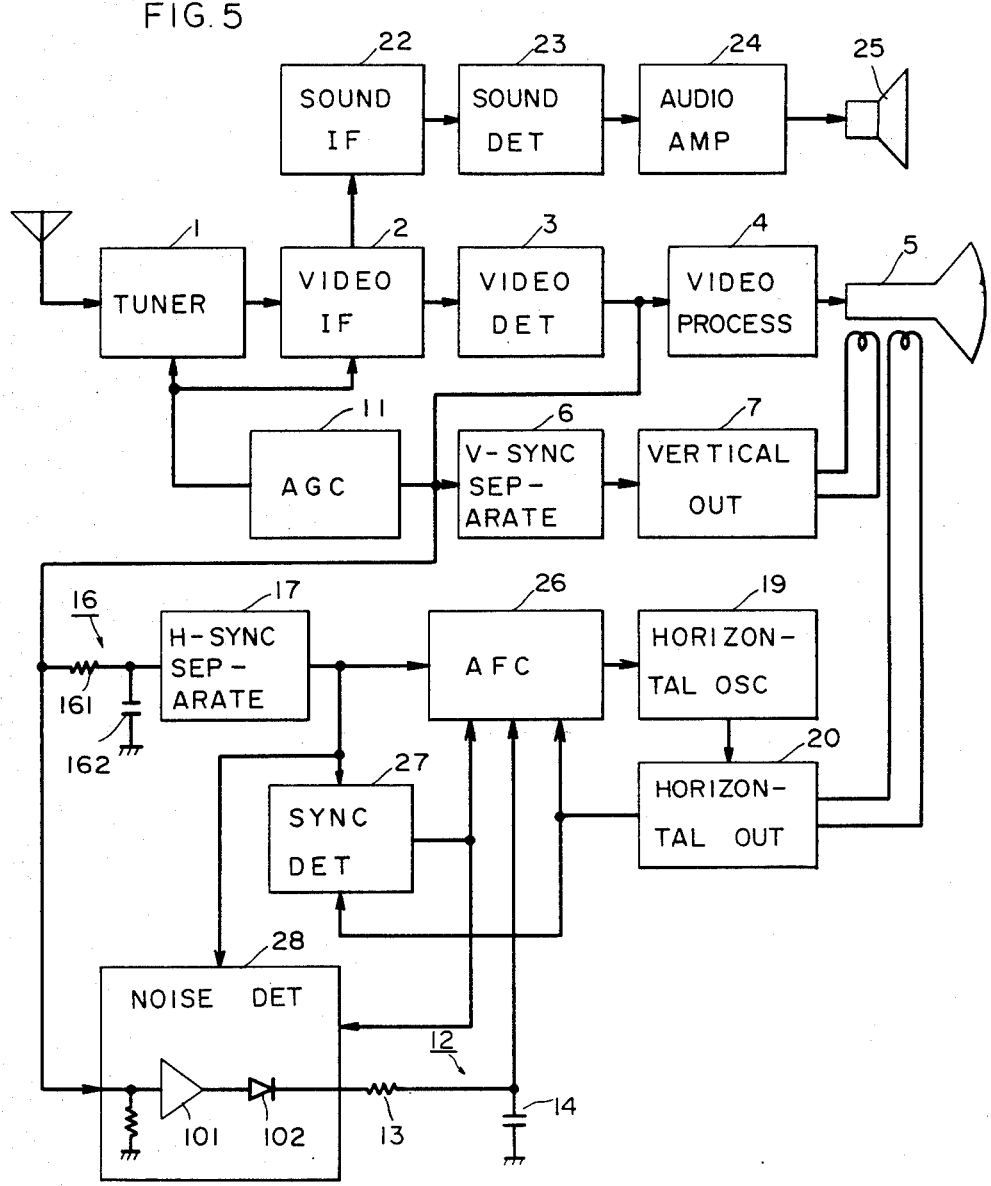
FIG. 5 is a block diagram of a television receiver in accordance with another embodiment of the present invention.

FIG. 5 is a block diagram of a television receiver in accordance with another embodiment of the present invention. The FIG. 5 embodiment is different from the FIG. 1 embodiment in that the FIG. 5 embodiment is adapted such that detection is made whether or not the horizontal output signal has been synchronized with the horizontal synchronizing signal and control of the automatic frequency control circuit 15 is disabled responsive to a non-synchronization detected signal. More specifically, the FIG. 1 embodiment involves an inconvenience that, when the horizontal output signal becomes out of synchronization with the horizontal synchronizing signal while the noise component included in the composite video signal is large and hence the sensitivity of the automatic frequency control circuit 15 has been decreased, it becomes impossible for the horizontal oscillating circuit 19 to maintain the oscillation frequency following that of the horizontal synchronizing signal. Therefore, horizontal synchronization comes to be in disorder and a proper image can not be reproduced on the picture tube 5.

Therefore, the FIG. 5 embodiment aims to make the oscillation frequency of the horizontal oscillating circuit 19 follow that of the horizontal synchronizing signal by disabling control of the sensitivity of the automatic frequency control circuit 15 in response to the noise detected output from the noise detecting circuit 10 even in the case of an increased noise component, thereby to maintain the sensitivity of the automatic frequency control circuit 15 without regard to an increase in the noise component. To that end, the FIG. 5 embodiment comprises a synchronization detecting circuit 27 provided in addition to the FIG. 1 embodiment. The synchronization detecting circuit 27 serves to detect whether the phase of the horizontal output signal from the horizontal output circuit 20 has coincided with the phase of the horizontal synchronizing signal and to provide a disabling signal to the noise detecting circuit 28 in the absence of coincidence or in the case of non-synchronization and also to provide a sensitivity selecting signal to the automatic frequency control circuit 26. The remaining portions of the FIG. 5 embodiment are substantially the same as those in the FIG. 1 embodiment and hence a more detailed description thereof will be omitted.

Figure 6:
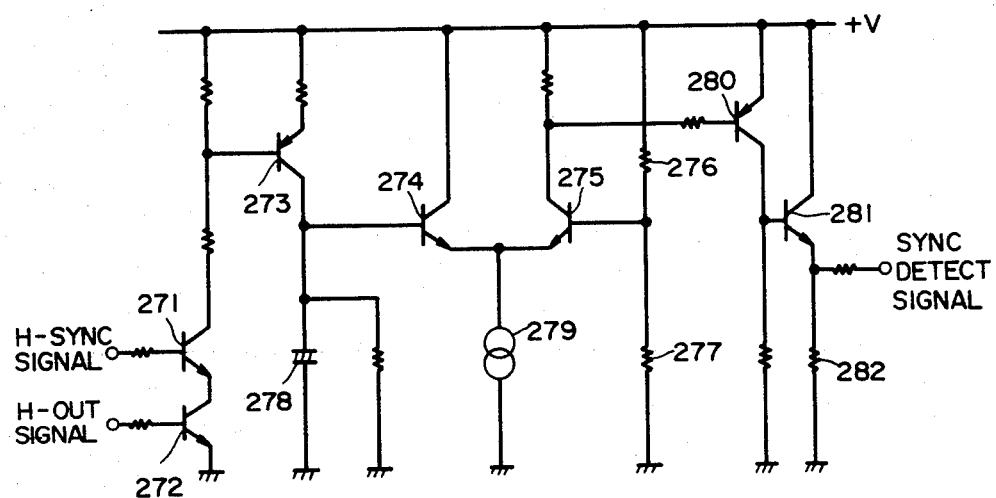
FIG. 6 is a schematic diagram of a synchronization detecting circuit shown in FIG. 5.

FIG. 6 is a schematic diagram of the synchronization detecting circuit 27 shown in FIG. 5. First referring to FIG. 6, the structure of the synchronization detecting circuit 27 will be described. The synchronization detecting circuit 27 comprises transistors 271, 272, 273, 274, 275, 280 and 281 and a constant current source 279. The base of the transistor 271 is supplied with the horizontal synchronizing signal and the base of the transistor 272 is supplied with the horizontal output signal. The emitter of the transistor 271 is connected to the collector of the transistor 272 and the emitter of the transistor 272 is connected to the ground. Accordingly, the collector of the transistor 271 is brought to the low level only during a period when the phase of the horizontal output signal coincides with the phase of the horizontal synchronizing signal. The signal obtained from the collector of the transistor 271 is supplied to the base of the transistor 273. A capacitor 278 is connected to the collector of the transistor 273. The capacitor 278 is charged during a time period when the horizontal output signal is synchronized with the horizontal synchronizing signal and the charged voltage is supplied to the base of one transistor 274 constituting a differential circuit. The base of the other transistor 275 of the differential circuit is supplied with a reference voltage obtained by voltage dividing the source voltage +V by means of resistors 276 and 277. The respective emitters of the transistors 274 and 275 are connected to the constant current source 279. Accordingly, if and when the horizontal output signal is synchronized with the horizontal synchronizing signal, the base of the transistor 274 is at a high level and the collector of the transistor 275 is at a low level. Conversely, if and when the horizontal output signal is not synchronized with the horizontal synchronizing signal, the base of the transistor 274 changes to a low level and the collector of the transistor 275 changes to a high level. The high level signal obtained from the collector of the transistor 275 is supplied to the base of the transistor 280, whereby the transistor 280 is rendered conductive. Therefore, the collector of the transistor 280 changes to a high level and this high level signal is supplied to the base of the transistor 281, whereby the transistor 281 is rendered conductive. The emitter of the transistor 281 is connected to the ground through the resistor 282. Accordingly, when the transistor 281 is rendered conductive, a high level signal is developed across the resistor 282. This high level signal is obtained as a non-synchronization detected signal representing non-coincidence of the phases of the horizontal output signal and the horizontal synchronizing signal, i.e. non-synchronization.

Figure 7:
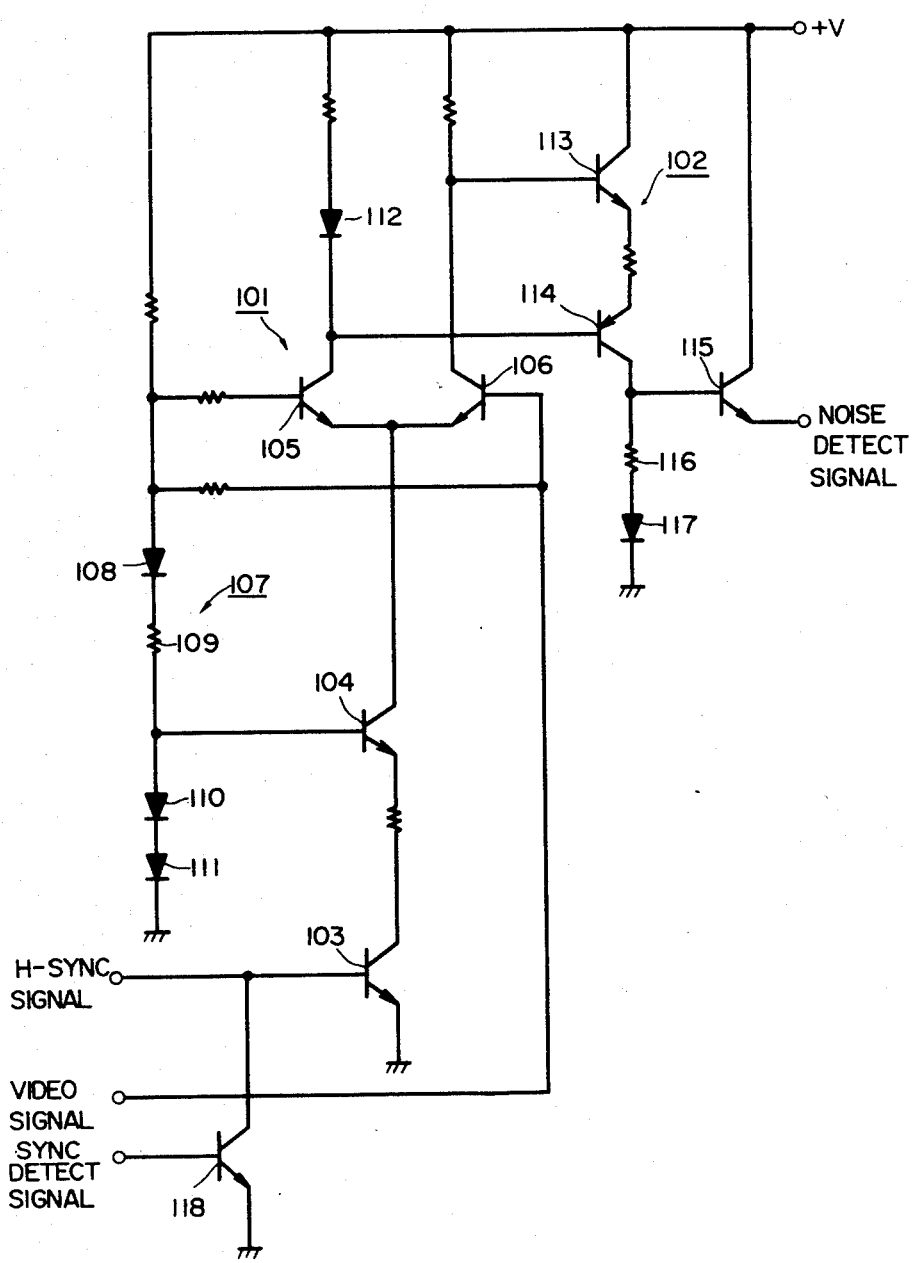
FIG. 7 is a schematic diagram of a noise detecting circuit shown in FIG. 5.

FIG. 7 is a schematic diagram of the noise detecting circuit 28 shown in FIG. 5. The noise detecting circuit 28 is substantially the same as the noise detecting circuit 10 shown in FIG. 2, excluding a transistor 118 newly provided in the noise detecting circuit 28. The base of the transistor 118 is supplied with the non-synchronization detected signal obtained from the synchronization detecting circuit 27 shown in FIG. 6. The collector of the transistor 118 is connected to the base of the transistor 103 and the emitter of the transistor 118 is connected to the ground. Accordingly, the transistor 118 is rendered conductive, whereby the base of the transistor 103 is connected to the ground, if and when the horizontal output signal and the horizontal synchronizing signal are out of synchronization and the non-synchronization detected signal of the high level is applied to the base of the transistor 118. Accordingly, the base of the transistor 103 is not supplied with the horizontal synchronizing signal any more and the amplifying circuit 101 is disabled, whereby the noise component included in the horizontal synchronizing signal period can not be extracted any more.

Figure 8:
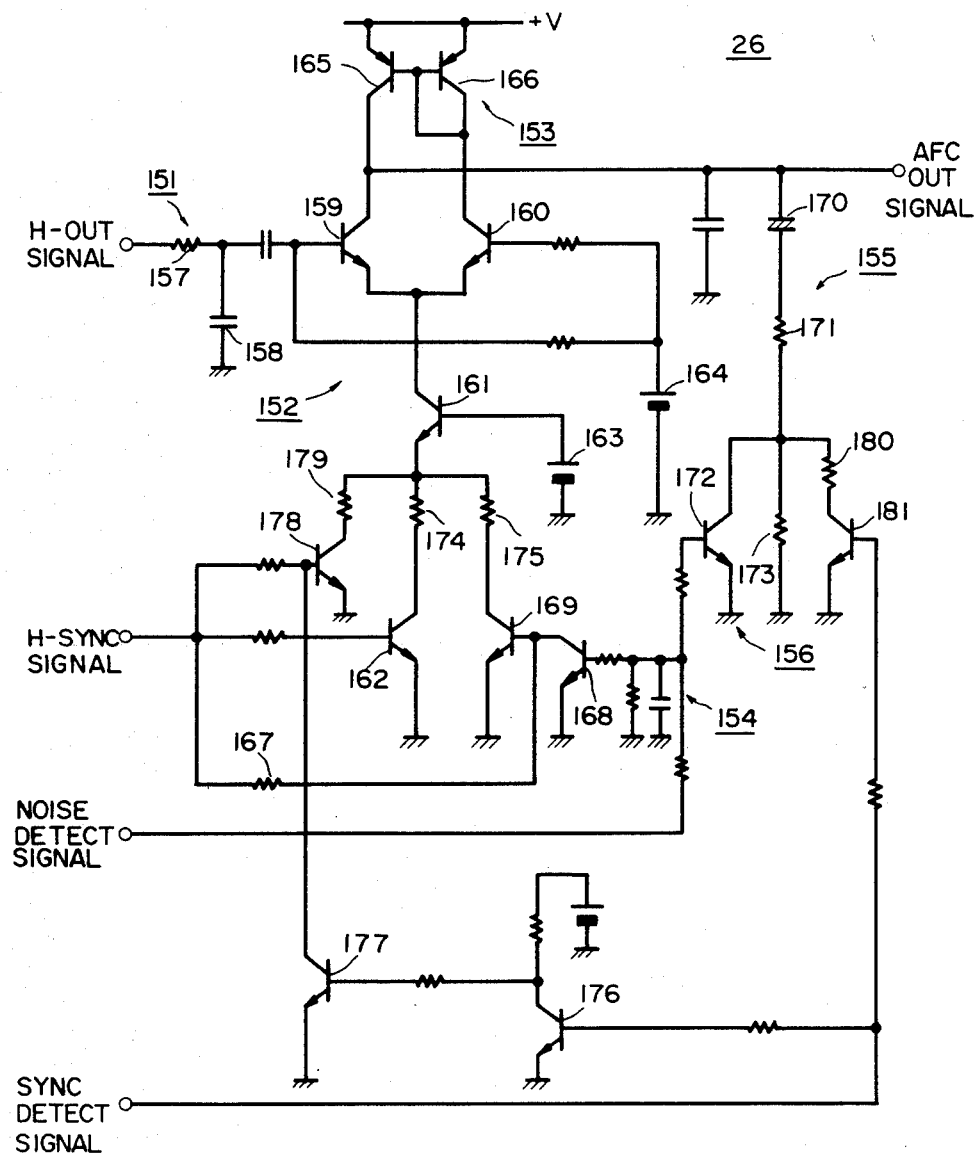
FIG. 8 is a schematic diagram of an automatic frequency control circuit shown in FIG. 5.

FIG. 8 is a schematic diagram of the automatic frequency control circuit 26 shown in FIG. 5. The automatic frequency control circuit 26 shown in FIG. 8 is adapted such that the sensitivity of the phase comparing circuit 152 is increased when the horizontal output signal is out of synchronization with the horizontal synchronizing signal and is substantially the same as the automatic frequency control circuit 15 shown in FIG. 3, apart from additional provision of transistors 176, 177, 178 and 181.

The base of the above described transistor 178 is supplied with the horizontal synchronizing signal. The collector of the transistor 178 is connected through a resistor 179 to the emitter of the constant current transistor 161. The transistor 178 is rendered conductive in response to the horizontal synchronizing signal only on the occasion of non-synchronization. Accordingly, when the transistor 178 is rendered conductive, it follows that the resistor 179 is connected in parallel with the resistors 174 and 175, with the result that the whole resistance value of the resistors connected to the emitter of the constant current transistor 161 is decreased. As a result, an increased current associated with the horizontal synchronizing signal flows through the transistor 161 to the transistors 159 and 160, whereby the sensitivity of the phase comparing circuit 152 is increased.

The above described transistor 178 is controlled so as to be rendered conductive responsive to the horizontal synchronizing signal only on the occasion of non-synchronization by means of the transistors 176 and 177. More specifically, the base of the transistor 176 is supplied with the non-synchronization detected signal. The collector of the transistor 176 is connected to the base of the transistor 177 and the collector of the transistor 177 is connected to the base of the above described transistor 178.

The transistor 181 is further provided for the purpose of slightly increasing the impedance of the filter 155 on the occasion of non-synchronization as compared to the occasion of noise detection. The base of the transistor 181 is supplied with the non-synchronization detected signal. The collector of the transistor 181 is connected to the filter 155 through the resistor 180. The resistance value of the resistor 180 is selected to be smaller than the resistance value of the resistor 173. The transistor 181 is rendered conductive on the occasion of non-synchronization, whereby the resistor 180 is connected in parallel with the resistor 173, so that the impedance of the filter 155 is decreased.

Now referring to FIGS. 5 to 8, the operation of the other embodiment of the present invention will be described. In the case where the horizontal output signal is in synchronization with the horizontal synchronizing signal, the transistors 271 and 272 of the synchronization detecting circuit 27 are rendered conductive at the same time, whereby the charged voltage of the capacitor 278 becomes high. If and when the terminal voltage of the capacitor 278 becomes higher than the reference voltage supplied to the base of the transistor 275, the transistor 274 is rendered conductive and the transistor 275 is rendered non-conductive. When the transistor 275 is rendered non-conductive, the transistors 280 and 281 are rendered non-conductive, whereby no current flows through the resistor 282. Accordingly, the voltage across the resistor 282, i.e. the non-synchronization detected signal, changes to a low level.

When the non-synchronization detected signal changes to a low level, the transistor 118 included in the noise detecting circuit 28 shown in FIG. 7 is rendered non-conductive. Since the base of the transistor 103 has been supplied with the horizontal synchronizing signal, the noise detecting circuit 28 is enabled, whereby the operation as described in conjunction with FIG. 2 is performed.

On the other hand, referring to the automatic frequency control circuit 26 shown in FIG. 8, since the level of the non-synchronization detected signal has become low, the transistor 176 is rendered non-conductive and as a result the transistor 177 is rendered conductive, while the transistor 178 is rendered non-conductive. The transistor 181 is also rendered non-conductive. As a result, in the same manner as that of the automatic frequency control circuit 15 described in conjunction with FIG. 3, the automatic frequency control circuit 26 shown in FIG. 8 is controlled in response to the noise detected signal obtained from the noise detecting circuit 28.

If and when the horizontal output signal becomes out of synchronization with the horizontal synchronizing signal, control of the automatic frequency control circuit 26 in response to the noise detecting circuit 28 is inhibited or disabled, and this time the automatic frequency control circuit 26 is controlled responsive to the non-synchronization detected signal obtained from the synchronization detecting circuit 27. More specifically, unless the horizontal output signal is in synchronization with the horizontal synchronizing signal, the synchronization detecting circuit 27 comes to have a decreased period when the transistors 271 and 272 are rendered conductive simultaneously with the result that the charged voltage of the capacitor 278 becomes low. Accordingly, the base of the transistor 274 changes to a low level. As a result, the transistor 274 is rendered non-conductive. On the other hand, since the transistor 275 is rendered conductive, the transistors 280 and 281 are also rendered conductive, whereby the voltage across the resistor 282 becomes high. Thus the level of the non-synchronization detected signal becomes high.

When the level of the non-synchronization detected signal becomes high, the transistor 118 of the noise detecting circuit 28 shown in FIG. 7 is rendered conductive. When the transistor 118 is rendered conductive, the base of the transistor 103 changes to ground potential and the horizontal synchronizing signal is not supplied to the base of the transistor 103 any more. Accordingly, the amplifying circuit 101 is disabled.

On the other hand, since the synchronization detected signal has become high, the transistor 176 is rendered conductive and the transistor 177 is rendered non-conductive. As a result, the transistor 178 is rendered conductive only during the high level period of the horizontal synchronizing signal, whereby the resistor 179 is connected in parallel with the resistors 174 and 175. As a result, the whole resistance value of the resistors connected to the emitter of the constant current transistor 161 becomes much smaller than that on the occasion of noise detection. As a result, an increased amount of current associated with the horizontal synchronizing signal flows through the differential circuit including the transistors 159 and 160, whereby the sensitivity of the phase comparing circuit 152 is increased. Furthermore, the transistor 181 is rendered conductive due to the fact that the level of the non-synchronization detected signal has become high, whereby the resistor 180 comes to be connected in parallel with the resistor 173. More specifically, the impedance of the filter 155 is decreased as compared with that on the occasion of synchronization of the strong electric field intensity but changes to a value larger than that on the occasion of noise detection of synchronization (of the weak electric field intensity).

Thus, in the case where the horizontal output signal is out of synchronization with the horizontal synchronizing signal, the sensitivity of the phase comparing circuit 152 included in the automatic frequency control circuit 26 is increased as compared with that on the occasion of noise detection and the impedance of the filter 155 is decreased as compared with that on the occasion of synchronization and is increased as compared with that on the occasion of noise detection. Accordingly, the output signal obtained from the automatic frequency control circuit 26 is magnified on the occasion of non-synchronization. More specifically, the control voltage applied to the horizontal oscillating circuit 19 is changed so that the horizontal output signal may follow the horizontal synchronizing signal.

Figure 9:
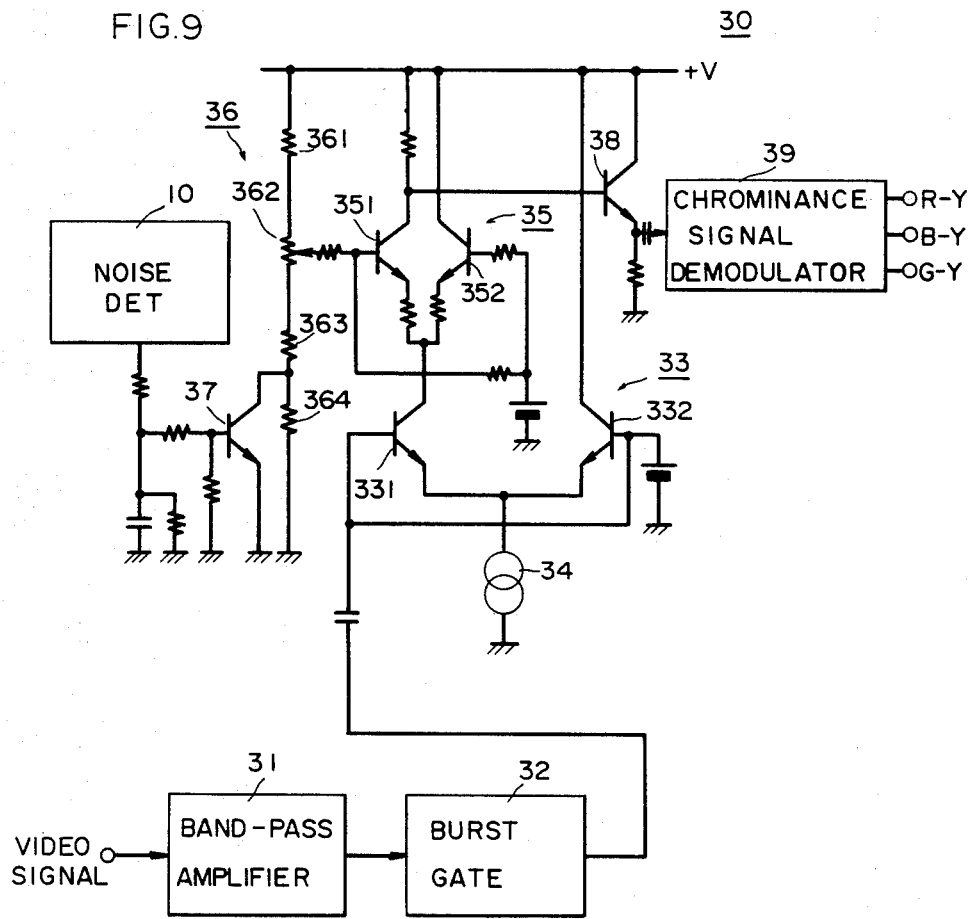
FIG. 9 is a schematic diagram showing still another embodiment of the present invention.

FIG. 9 is a schematic diagram of a further embodiment of the present invention. The FIG. 9 embodiment comprises a scheme adapted for decreasing a color noise due to a noise component appearing on the screen of the picture tube 5 by controlling a color control circuit 30 of a television receiver in response to noise detection. The color control circuit 30 shown in FIG. 9 is included in the video signal processing circuit 4 shown in FIG. 1.

Referring to FIG. 9, the structure and operation of the embodiment will be described. The composite video signal is applied to a band-pass amplifying circuit 31. The band-pass amplifying circuit 31 serves to extract a color carrier signal including a color burst from the composite video signal to provide the extracted signal to a burst gate circuit 32. The burst gate circuit 32 serves to extract a burst signal from the color carrier signal to provide the extracted burst signal to a color synchronization circuit, not shown, and also to provide the color carrier signal, with the burst signal removed, to a color control circuit 30. The color control circuit 30 comprises a differential circuit 33, a constant current source 34, a differential amplifying circuit 35, a biasing circuit 36, a transistor 37 and a transistor 38 serving as an emitter follower circuit. The differential circuit 33 comprises transistors 331 and 332 and the base of one transistor 331 is supplied with the color carrier signal from the above described burst gate circuit 32. The respective emitters of the transistors 331 and 332 are commonly connected to the constant current voltage source 34. The differential amplifying circuit 35 comprises transistors 351 and 352 constituting branched paths of the above described transistor 331. The biasing circuit 36 comprises a series connection of a resistor 361, a variable resistor 362, and resistors 363 and 364 and the biasing voltage set by the variable resistor 362 is supplied to the base of the transistor 351 of the above described differential amplifying circuit 35. Accordingly, adjustment of the variable resistor 362 makes adjustment of the biasing voltage of the differential amplifying circuit 35 so that the gain of the differential amplifying circuit 35 may be changed. The collector and the emitter of the transistor 37 are connected to both ends of the resistor 364 of the biasing circuit 36. The base of the transistor 37 is supplied with the noise detected signal obtained from the noise detecting circuit 10 described in conjunction with FIG. 2. Accordingly, when a noise component is small and the noise detected signal of the low level is obtained from the noise detecting circuit 10 and is applied to the base of the transistor 37, the transistor 37 is rendered non-conductive, whereby the resistor 364 is rendered effective. Accordingly, the biasing voltage set by the variable resistor 362 becomes relatively high and the gain of the differential amplifying circuit 35 becomes large. When the color carrier signal is applied to the base of the transistor 331, a current associated with the color carrier signal flows through the collector of the transistor 331. The above described current is branched to the transistors 351 and 352 of the differential amplifying circuit 35, whereby the output signal is obtained from the collector of the transistor 351. The output signal is applied to the chrominance signal demodulator 39 through the transistor 38 serving as the emitter follower circuit. As a result, the demodulated output signals R-Y, B-Y and G-Y are obtained therefrom.

When a noise component is detected by the noise detecting circuit 10 and the noise detected signal of the high level is obtained therefrom, the transistor 37 is rendered conductive, whereby the resistor 364 is shunted. As a result, the biasing voltage set by the variable resistor 362 becomes low. As a result, the gain of the differential amplifying circuit 35 is decreased and the level of the color carrier signal being applied to the chrominance signal demodulator 39 is decreased. Therefore, according to the embodiment shown, the gain of the differential amplifying circuit 35 can be decreased in accordance with an increase of the noise component and hence a color noise due to an increased noise component can be decreased.

Figure 10:
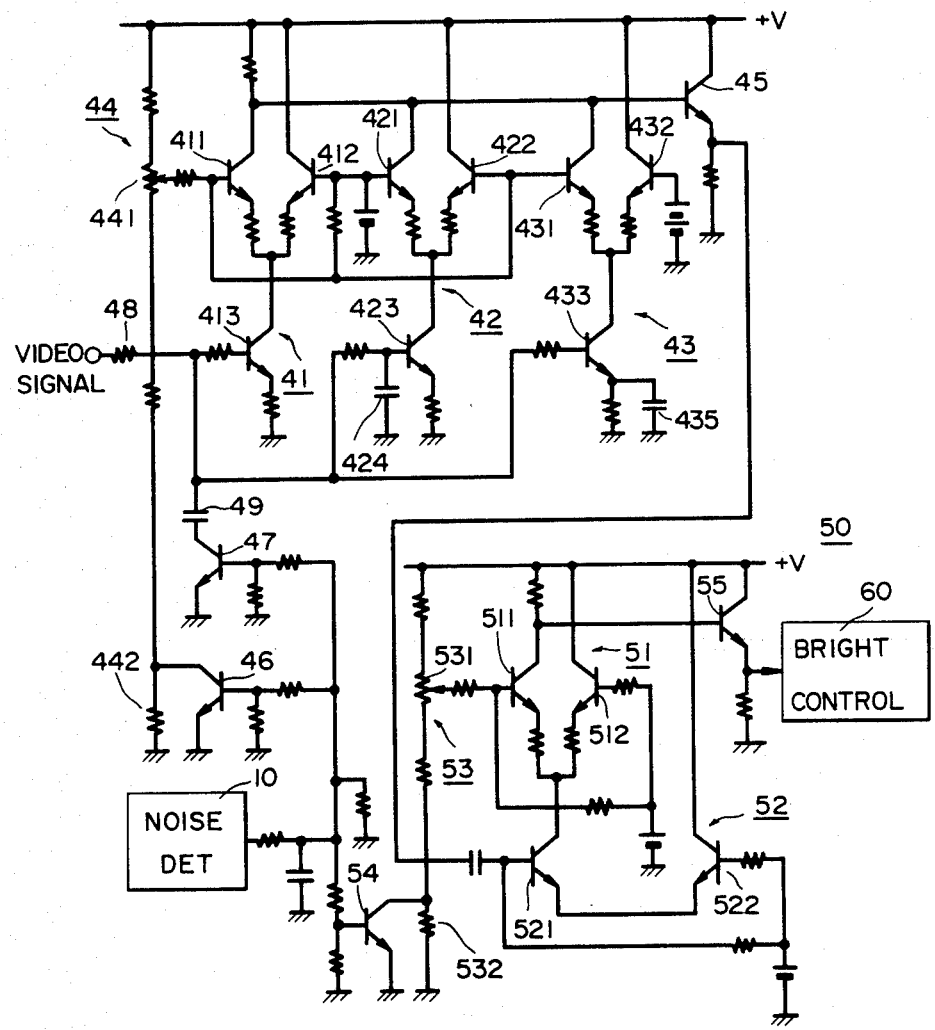
FIG. 10 is a schematic diagram showing still a further embodiment of the present invention.

FIG. 10 is a schematic diagram of still a further embodiment of the present invention. The FIG. 10 embodiment comprises a scheme for attenuating a high frequency component in the video signal by a video tone controlling circuit 40 and for decreasing the level of the brightness signal by a contrast circuit 50 in accordance with an increased noise component. The video tone controlling circuit 40 and the contrast circuit 50 shown in FIG. 10 are both included in the video signal processing circuit 4 shown in FIG. 1.

Now referring to FIG. 10, the structure and the operation of the embodiment will be described. The video tone controlling circuit 40 comprises a flat circuit 41, a low frequency region emphasizing circuit 42, a high frequency region emphasizing circuit 43, a biasing circuit 44, an emitter follower circuit 45 and transistors 46 and 47. The flat circuit 41 serves to amplify the video signal as such and comprises transistors 411, 412 and 413. The low frequency region emphasizing circuit 42 aims to emphasize a low frequency region component of the video signal and comprises transistors 421, 422 and 423 and a capacitor 424. The capacitor 424 aims to absorb a high frequency region component of the video signal. The high frequency region emphasizing circuit 43 aims to emphasize a high frequency region component of the video signal and comprises transistors 431, 432 and 433 and a capacitor 435. The capacitor 435 aims to emphasize a high frequency region component of the video signal. The biasing circuit 44 is adapted to select any one of the flat circuit 41, the low frequency region emphasizing circuit 42 and the high frequency region emphasizing circuit 43. More specifically, the biasing circuit 44 comprises a variable resistor 441. The fixed biasing voltages of the respective circuits 41, 42 and 43 are selected such that when the biasing voltage is set to be low by the variable resistor 441 the low frequency region emphasizing circuit 42 is enabled, while when the biasing voltage is set to be high by the variable resistor 441 the high frequency region emphasizing circuit 43 is enabled, and in the intermediate state the flat circuit 41 is enabled.

The above described variable resistor 441 is connected to the ground through the resistor 442. The transistor 46 is connected at the collector and emitter thereof in parallel with the resistor 442. The base of the transistor 46 is supplied with a noise detected signal obtained from the noise detecting circuit 10. Accordingly, when a noise detected signal of the high level is applied to the base of the transistor 46 in accordance with an increase of the noise component, the transistor 46 is rendered conductive and the resistor 441 is short-circuited. As a result, the biasing voltage set by the variable resistor 441 is decreased and the low frequency region emphasizing circuit 42 is enabled. More specifically, as the noise component increases, the low frequency region emphasizing circuit 42 is forcedly enabled, with the result that the low frequency region component of the video signal is emphasized.

A low-pass filter including a resistor 48 and a capacitor 49 is coupled to an input path of a signal of the flat circuit 41, the low frequency region emphasizing circuit 42 and the high frequency region emphasizing circuit 43. The capacitor 49 of the low-pass filter is connected to the collector of the transistor 47 and the base of the transistor 47 is supplied with the noise detected signal. Accordingly, the noise detected signal of the high level is applied to the base of the transistor 47 in accordance with an increase of the noise component, the transistor 47 is rendered conductive and the low-pass filter is enabled. As a result, the high frequency region component of the video signal being applied to the low frequency region emphasizing circuit 42 is attenuated also by means of the low-pass filter. Therefore, according to the embodiment, the high frequency region component of the video signal being applied to the video tone controlling circuit 40 is attenuated by the low-pass filter and the low frequency region component of the video signal is emphasized by the low frequency region emphasizing circuit 42 and therefore a picture having a soft appearance can be reproduced on the screen of the picture tube 5 with little influence by the noise component.

Now the contrast circuit 50 will be described. The contrast circuit 50 comprises a differential amplifying circuit 51, a differential circuit 52, a biasing circuit 53, a transistor 54 and an emitter follower circuit 55. The differential circuit 52 comprises transistors 521 and 522 and the base of the transistor 521 is supplied with the video signal from the above described video tone controlling circuit 40. As a result, a collector associated with the video signal flows into the collector of the transistor 521. The differential amplifying circuit 51 comprises transistors 511 and 512, constituting branched paths of a current flowing into the collector of the above described transistor 521. The gain of the differential amplifying circuit 51 is controlled in association with the biasing voltage set by the biasing circuit 53. More specifically, the biasing circuit 53 comprises a variable resistor 531. If the biasing voltage is set to be high by the variable resistor 531 the gain of the differential amplifying circuit 51 is increased, whereas if the biasing voltage is set to be low by the variable resistor 531 the gain of the differential amplifying circuit 51 is decreased, whereby the contrast is decreased. The variable resistor 531 is connected to the ground through the resistor 532. The transistor 54 is connected at the collector and emitter thereof in parallel with the resistor 532. The base of the transistor 54 is supplied with the noise detected signal obtained from the noise detecting circuit 10. Accordingly, when the noise detected signal of the high level is obtained from the noise detecting circuit 10 in accordance with an increase of the noise component and is applied to the base of the transistor 54, the transistor 54 is rendered conductive, whereby the resistor 534 is short-circuited. As a result, the biasing voltage of the differential amplifying circuit 51 is decreased and the gain of the differential amplifying circuit 51 is decreased. Therefore, according to the embodiment, the high frequency region component of the video signal is attenuated by the video tone controlling circuit 40 and the contrast of the contrast circuit 50 is also decreased in accordance with an increase of the noise component and therefore the video tone can be made to be soft and a flickering phenomenon on the screen due to a noise component can also be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A noise detecting circuit for detecting a noise component in a composite video signal including a synchronizing signal of a television signal, comprising:
   composite video signal providing means for providing said composite video signal,
   synchronizing signal separating means operatively coupled to said composite video signal providing means for separating a synchronizing signal from said composite video signal provided from said composite video signal providing means,
   noise component extracting means responsive to said synchronizing signal obtained from said synchronizing signal separating means for extracting a noise component included during the period of said synchronizing signal in said composite video signal, and
   rectifying/smoothing means for rectifying and smoothing the output from said noise component extracting means for providing a direct current voltage associated with the magnitude of said noise component in said composite video signal.

2. A noise detecting circuit in accordance with claim 1, wherein said composite video signal providing means comprises a signal processing circuit, said signal processing circuit serving to differentiate said composite video signal, whereby a spike noise occurs at each of the leading and trailing edges of said synchronizing signal, and said synchronizing signal separating means comprises means for providing said synchronizing signal with a slight delay in phase, whereby said spike noise associated with said leading edge of said synchronizing signal is removed from said extracted noise component.

3. A noise detecting circuit in accordance with claim 2, wherein said rectifying/smoothing means comprises means for rectifying said noise component in the polarity opposite to the polarity of said spike noise associated with said trailing edge of said synchronizing signal, whereby said spike noise associated with said trailing edge of said synchronizing signal is removed.

4. A television receiver, comprising:

composite video signal providing means for providing a composite video signal including a horizontal synchronizing signal, horizontal synchronizing signal separating means operatively coupled to said composite video signal providing means for separating said horizontal synchronizing signal from said composite video signal, noise component extracting means responsive to said horizontal synchronizing signal obtained from said horizontal synchronizing signal separating means for extracting a noise component included during the period of said horizontal synchronizing signal in said composite video signal, rectifying/smoothing means for rectifying and smoothing the output from said noise component extracting means for providing a direct current voltage associated with the magnitude of said noise component in said composite video signal, horizontal circuit means for generating a horizontal output signal, horizontal synchronization automatic frequency control means responsive to said horizontal synchronizing signal for performing an automatic frequency control operation with a given sensitivity of a response operation upon said horizontal circuit means, and control means responsive to said direct current voltage from said rectifying/smoothing means for controlling the sensitivity of a response operation of said horizontal synchronization automatic frequency control means.

5. A television receiver in accordance with claim 4, wherein said horizontal circuit means comprises horizontal oscillating means responsive to the output from said horizontal synchronization automatic frequency control means for making oscillation at the frequency associated with said output from said horizontal synchronization automatic frequency control means, and horizontal output signal providing means responsive to the output from said horizontal oscillating means for providing said horizontal output signal, and said horizontal synchronization automatic frequency control means comprises phase comparing means for comparing the phases of said horizontal synchronizing signal from the said horizontal synchronizing signal separating means and said horizontal output signal from said horizontal output signal providing means, and gain varying means for varying the gain of said phase comparing means, and said control means comprises gain control means responsive to an increase of said direct current voltage from said rectifying/smoothing means for controlling said gain varying means for varying the gain of said phase comparing means.

6. A television receiver in accordance with claim 5, wherein said gain control means comprises means responsive to an increase of said direct current voltage for controlling said gain control means for decreasing the gain of said phase comparing means.

7. A television receiver in accordance with claim 4, wherein said horizontal synchronization automatic frequency control means comprises filter means at the output thereof, and said control means comprises impedance control means responsive to said direct current voltage from said rectifying/smoothing means for controlling the impedance of said filter means.

8. A television receiver in accordance with claim 7, wherein said impedance control means comprises means responsive to an increase of said direct current voltage for decreasing the impedance of said filter means.

9. A television receiver in accordance with claim 4, wherein said horizontal circuit means comprises horizontal oscillating means responsive to the output from said horizontal synchronization automatic frequency control means for making oscillation at the frequency associated with said output from said horizontal synchronization automatic frequency control means, and horizontal output signal providing means responsive to the output from said horizontal oscillating means for providing said horizontal output signal, and said horizontal synchronization automatic frequency control means comprises phase comparing means for comparing the phases of said horizontal synchronizing signal from the said horizontal synchronizing signal separating means and said horizontal output signal from said horizontal output signal providing means, and gain varying means for varying the gain of said phase comparing means, and which further comprises non-synchronization detecting means responsive to said horizontal synchronizing signal from said horizontal synchronizing signal separating means and said horizontal output signal from said horizontal circuit means for detecting non-synchronization of said horizontal output signal with said horizontal synchronizing signal, gain control means responsive to said non-synchronization detected signal from said non-synchronization detecting means for disabling said noise component extracting means, and means responsive to said non-synchronization detected signal from said non-synchronization detecting means for controlling said gain varying means for varying the gain of said phase comparing means.

10. A television receiver in accordance with claim 9, wherein said gain control means comprises means responsive to said non-synchronization detected signal for increasing said gain of said phase comparing means.

11. A television receiver in accordance with claim 4, wherein said horizontal synchronization automatic frequency control means comprises filter means at the output thereof, and which further comprises impedance control means responsive to said non-synchronization detected signal from said non-synchronization detecting means for controlling the impedance of said filter means.

12. A television receiver in acordance with claim 11, wherein said impedance control means comprises means responsive to said non-synchronization detected signal from said non-synchronization detecting means for decreasing said impedance of said filter means.

13. A television receiver, comprising:

composite video signal providing means for providing a composite video signal including a synchronizing signal, synchronizing signal separating means operatively coupled to said composite video signal providing means for separating said synchronizing signal from said composite video signal, noise component extracting means responsive to said synchronizing signal obtained from said synchronizing signal separating means for extracting a moise component during the period of said synchronizing signal in said composite video signal, rectifying/smoothing means for rectifying and smoothing the output from said moise component extracting means for providing a direct current voltage associated with the magnitude of said noise component in said composite video signal, color control circuit means for controlling a chrominance signal component of said composite video signal from said composite video signal providing means, and means responsive to said direct current voltage from said rectifying/smoothing circuit means for controlling a magnitude of a chrominance signal in said color control circuit means.

14. A television receiver, comprising:

composite video signal providing means for providing a composite video signal including a synchronizing signal, synchronizing signal separating means operatively coupled to said composite video signal providing means for separating said synchronizing signal from said composite video signal, noise component extracting means responsive to said synchronizing signal obtained from said synchronizing signal separating means for extracting a noise component during the period of said synchronizing signal in said composite video signal, rectifying/smoothing means for rectifying and smoothing the output from said noise component extracting means for providing a direct current voltage associated with the magnitude of said noise component in said composite video signal, video tone controlling means for controlling an attenuation amount of a high frequency region component of said composite video signal from said composite video signal providing means, and means responsive to said direct current voltage from said rectifying/smoothing means for controlling said attenuation amount of said high frequency region component of said composite video signal by said video tone controlling circuit means.

15. A television receiver, comprising:

composite video signal providing means for providing a composite video signal including a sychronizing signal, synchronizing signal separating means operatively coupled to said composite video signal providing means for separating said synchronizing signal from said composite video signal, noise component extracting means responsive to said synchronizing signal obtained from said synchronizing signal separating means for extracting a noise component during the period of said synchronizing signal in said composite video signal, rectifying/smoothing means for rectifying and smoothing the output from said noise component extracting means for providing a direct current voltage associated with the magnitude of said noise component in said composite video signal, contrast circuit means for controlling the brightness component of said composite video signal from said composite video signal providing means, and means responsive to said direct current voltage from said rectifying/smoothing means for controlling a magnitude of the signal in said contrast circuit means.

* * * * *